(12) United States Patent
Lee et al.

(10) Patent No.: US 7,109,024 B2
(45) Date of Patent: Sep. 19, 2006

(54) BIOMOLECULE-BOUND SUBSTRATES

(75) Inventors: Kan-Hung Lee, Sanchong (TW);
Yu-Hau Shih, Sanchong (TW);
Chuan-Mei Tsai, Hsinchu (TW);
Yih-Weng Wang, Tainan (TW); Hsiung Hsiao, Taipei (TW); Chi-Horng Bair, Tucheng (TW); Shin-Hwan Wang, Hsinchu (TW)

(73) Assignee: Dr. Chip Biotechnology Inc., Miao-Li (TW)

( * ) Notice: Subject to any disclaimer, the term of this patent is extended or adjusted under 35 U.S.C. 154(b) by 188 days.

(21) Appl. No.: 10/408,519

(22) Filed: Apr. 7, 2003

(65) Prior Publication Data
US 2003/0228683 A1 Dec. 11, 2003

Related U.S. Application Data

(63) Continuation-in-part of application No. 09/522,417, filed on Mar. 9, 2000, now abandoned.

(51) Int. Cl.
*C12M 1/34* (2006.01)

(52) U.S. Cl. .................. 435/287.2; 427/508; 427/553; 427/586; 427/595; 435/283.1; 435/288.3; 435/6; 436/518; 436/524; 436/527; 436/529; 436/530; 436/531

(58) Field of Classification Search ............... 436/518, 436/524, 527, 529, 530, 531; 435/40.5, 40.51, 435/283.1, 288.3, 6, 287.2; 422/21, 68.1; 427/508, 553, 586, 595; 522/1–5; 523/137; 530/333, 334; 428/480, 492, 497, 532
See application file for complete search history.

(56) References Cited

U.S. PATENT DOCUMENTS

| | | | |
|---|---|---|---|
| 4,514,508 A * | 4/1985 | Hirschfeld | 436/518 |
| 4,657,873 A | 4/1987 | Gadow et al. | 436/532 |
| 4,806,631 A | 2/1989 | Carrico et al. | 536/27 |
| 4,808,530 A | 2/1989 | Means et al. | 435/180 |
| 5,002,883 A | 3/1991 | Bieniarz et al. | 435/176 |
| 5,424,186 A | 6/1995 | Fodor et al. | 435/6 |
| 5,514,785 A | 5/1996 | Van Ness et al. | 536/22.1 |
| 5,610,287 A | 3/1997 | Nikiforov et al. | 536/24.3 |
| 5,663,318 A | 9/1997 | Pegg et al. | 536/24.3 |
| 5,747,244 A | 5/1998 | Sheridan et al. | 435/6 |
| 5,807,522 A | 9/1998 | Brown et al. | 422/50 |
| 5,919,626 A | 7/1999 | Shi et al. | 435/6 |
| 5,994,110 A | 11/1999 | Mosbach et al. | 435/173.1 |
| 6,057,100 A | 5/2000 | Heyneker | 435/6 |
| 6,060,240 A | 5/2000 | Kamb et al. | 435/6 |
| 6,087,102 A | 7/2000 | Chenchik et al. | 435/6 |
| 6,143,037 A | 11/2000 | Goldstein et al. | 623/66 |
| 6,162,511 A | 12/2000 | Garnett et al. | 427/514 |
| 6,180,770 B1 | 1/2001 | Boles et al. | 536/23.1 |
| 6,197,503 B1 | 3/2001 | Vo-Dinh et al. | 435/6 |
| 6,210,537 B1 | 4/2001 | Murphy et al. | 204/157.15 |
| 6,268,128 B1 | 7/2001 | Collins et al. | 435/6 |

OTHER PUBLICATIONS

Chrisey et al., "Covalent Attachment of Synthetic DNA to Self-assembled Monolayer Films", Nucleic Acids Research 24:3031-3039, 1996.
Church et al., Geneomic Sequencing, Proc. Natl. Acad. Sci. USA, 81:1991-1995, 1984.
Holmstrom et al., "A Highly Sensitive and Fast Nonradioactive Method for Detection of Polymerase Chain Reaction Products", Analytical Biochemistry 209:278-283, 1993.
Kawai et al., "A Simple Method of Detecting Amplified DNA with Immobilized Probes on Microtiter Wells", Analytical Biochemistry 209:63-69, 1993.
Kristensen et al., "A Stable Substrate for DNA Microarrays", Clinical Note 28-30, 2002.
Liu et al., "DNA Amplification and Hybridization Assays in Integrated Plastic Monolithic Devices", Anal. Chem. 74:3063-3070, 2002.
Maskos et al., "Oligonucleotide Hybridisations on Glass Supports: A Novel Linker for Oligonucleotide Synthesis and Hybridisation Properties of Oligonucleotides Synthesised in situ", Oxford University Press, Nucleic Acids Research 20:1679-1684, 1992.
Matson et al., "Biopolymer Synthesis on Polypropylene Supports: Oligonucleotide Arrays", Analytical Biochemistry 224:110-116, 1995.
Matte et al., "Technical Parameters for the Use of Corning DNA-BIND Products in High-Throughput Screening", Corning Surface Technologies, (on-line publication).
Puig-Llexia et al., "Polyurethane-acrylate Photocurable Polymeric Membrane for Ion-sensitive Field Effect Transistor Based Urea Biosensors", Analytica Chimica Acta 389:179-188, 1999.
Rasmussen et al., "Covalent Immobilization of DNA onto Polystyrene Microwells: The Molecules Are Only Bound at the 5' End", Analytical Biochemistry 198:138-142, 1991.
Rehman et al., "Immobilization of Acrylamide-modified Oligonucleotides by Co-polymerization", Nucl. Acid. Res. 27:649, 1999.
Vasiliskov et al., "Favrication of Microarray of Gel-immobilized Compounds on a Chip by Copolymerization", Biotechniques 27:592, 594, 596-598, 600, 602, 604, 606, 1999.
Velev et al., "In Situ Assembly of Colloidal Particles into Minaturized Biosensors", Langmuir 15:3693-3698, 1999.
Weiler et al., "Combining the Preparation of Oligonucleotide Arrays and Synthesis of High-Quality Primers", Analytical Biochemistry 243:218-227, 1996.

* cited by examiner

*Primary Examiner*—Christopher L. Chin
(74) *Attorney, Agent, or Firm*—Fish & Richardson P.C.

(57) ABSTRACT

This invention features a biomolecule-bound substrate that includes a support made of an organic polymer and having an unmodified surface; and a plurality of unmodified biomolecules immobilized on the unmodified surface. The organic polymer is acrylic resin, polypropylene, polystyrene, polyethylene, polyvinyl chloride, polysulfone, polycarbonate, cellulose acetate, rubber, latex, polyethylene terephthalate, acrylonitrile butadiene styrene, acrylonitrile styrene, or a combination thereof. The substrate is formed by placing the unmodified biomolecules on the unmodified surface followed by ultraviolet irradiation.

20 Claims, No Drawings

SEQUENCE LISTING

<160> NUMBER OF SEQ ID NOS: 5

<210> SEQ ID NO 1
<211> LENGTH: 52
<212> TYPE: DNA
<213> ORGANISM: Artificial Sequence
<220> FEATURE:

-continued

```
<223> OTHER INFORMATION: Probe from 5' ends of enterovirus genes

<400> SEQUENCE: 1
tttttttttt tttttttttt tttttccctc cggccctga atgcggctaa tc           52

<210> SEQ ID NO 2
<211> LENGTH: 58
<212> TYPE: DNA
<213> ORGANISM: Artificial Sequence
<220> FEATURE:
<223> OTHER INFORMATION: Probe from 5' ends of enterovirus genes

<400> SEQUENCE: 2
tttttttttt tttttttttt tttttgtcg taacgsgcaa stcygyrgcg gaaccgac     58

<210> SEQ ID NO 3
<211> LENGTH: 53
<212> TYPE: DNA
<213> ORGANISM: Artificial Sequence
<220> FEATURE:
<223> OTHER INFORMATION: Probe from 5' ends of enterovirus genes

<400> SEQUENCE: 3
tttttttttt tttttttttt tttttactt tgggtgtccg tgtttchttt tat          53

<210> SEQ ID NO 4
<211> LENGTH: 21
<212> TYPE: DNA
<213> ORGANISM: Artificial Sequence
<220> FEATURE:
<223> OTHER INFORMATION: Primer

<400> SEQUENCE: 4
caagcacttc tgthhccccg g                                            21

<210> SEQ ID NO 5
<211> LENGTH: 20
<212> TYPE: DNA
<213> ORGANISM: Artificial Sequence
<220> FEATURE:
<223> OTHER INFORMATION: Primer

<400> SEQUENCE: 5
attgtcacca taagcagcca                                              20
```

BIOMOLECULE-BOUND SUBSTRATES

CROSS REFERENCE TO RELATED APPLICATION

This application is a continuation-in-part of U.S. Utility application Ser. No. 09/522,417, filed Mar. 9, 2000.

BACKGROUND

Many analytical and preparative methods used in biology and medicine are based on binding molecules of interest that are contained in a biological sample to ligands attached to a substrate.

Generally, the ligands are biomolecules (e.g., polypeptides or nucleic acids), cells, or drugs. The substrate is a support made of plastics, glass, silicon, fiber, or cellulose. A ligand can be stably attached to a substrate surface, either by covalent bonding or non-covalent interaction.

A large number of different ligands can be attached to a substrate to generate a ligand array. Such an array allows simultaneous analyses of different types of molecules in a biological sample through binding the molecules to specific ligands within the array. There are many important applications of ligand arrays, including drug discovery and diagnostic medicine. See, e.g., U.S. Pat. No. 6,171,797B1.

SUMMARY

The present invention is based on the unexpected discovery that unmodified biomolecules can be conveniently immobilized on an unmodified surface of certain organic polymer substrates under UV irradiation.

Thus, one aspect of this invention features a biomolecule-bound substrate that includes a support made of an organic polymer and having an unmodified surface; and a plurality of unmodified biomolecules immobilized on the unmodified surface. The organic polymer is acrylic resin, polypropylene, polystyrene, polyethylene, polyvinyl chloride, polysulfone, polycarbonate, cellulose acetate, rubber, latex, polyethylene terephthalate, acrylonitrile butadiene styrene, acrylonitrile styrene, or a combination thereof. While the support contains mostly one or more of the just-mentioned organic polymers for binding with biomolecules, it can also include other minor ingredients (e.g., a dye). The substrate is formed by the method of placing the unmodified biomolecules on the unmodified surface followed by ultraviolet irradiation. Also within the scope of the invention is this method of preparing such a biomolecule-bound substrate.

The support can be flexible and capable of being bent, folded, or otherwise manipulated for its intended use without breakage. It can also be rigid and takes on a desired shape, such as sheet, tube, disc, or sphere. The support can be used alone, or in combination with another suitable support (e.g., glass). It may have a planar surface (e.g., a slide), a convex surface (e.g., a bead), or a concave surface (e.g., a well).

The biomolecule can be a biopolymer (e.g., an oligonucleotide, a peptide, a polysaccharide, or a glycoprotein) or a biomonomer (e.g., a nucleoside, an amino acid, or a monosaccharide). It can be naturally occurring or synthesized. The term "unmodified biomolecules" refers to biomolecules that have not been modified chemically for introduction of a functional group to facilitate their binding to an unmodified surface of an organic polymer support. The term "unmodified surface" refers to a surface of an organic polymer support that has not been modified chemically for introduction of a functional group to facilitate its binding with biomolecules.

In another aspect, the invention features a biomolecule-bound substrate that includes a support made of an organic polymer and having an unmodified non-porous surface; and a plurality of unmodified biomolecules immobilized on the unmodified non-porous surface. The organic polymer is acrylic resin, polypropylene, polystyrene, polyethylene, polyvinyl chloride, polysulfone, polycarbonate, cellulose acetate, rubber, latex, polyethylene terephthalate, acrylonitrile butadiene styrene, acrylonitrile styrene, nylon, nitrocellulose, or a combination thereof. The substrate is formed by the method of placing the unmodified biomolecules on the unmodified non-porous surface followed by ultraviolet irradiation. This method is also within the scope of the present invention. Clearly, the non-porous surface immobilizes biomolecules by a mechanism other than trapping them in pores.

The details of one or more embodiments of the invention are set forth in the accompanying drawings and the description below. Other features, objects, and advantages of the invention will be apparent from the description and from the claims.

DETAILED DESCRIPTION

A biomolecule-bound substrates of this invention can be prepared by placing a plurality of unmodified biomolecules on an unmodified surface of a support made of a suitable organic polymer; and irradiating the unmodified biomolecules and the unmodified surface with ultraviolet light. In this method, the ultraviolet light has a center wavelength ranging, for example, from 254 to 365 nm. The irradiation duration is chosen so as to effect binding without degrading the biomolecules and the organic polymer molecules. To practice this invention, one can employ ultraviolet light of different wavelengths for different irradiation durations, and also employ different distances between the ultraviolet light source and the unmodified surface of the support. These parameters vary depending on the organic polymer and the biomolecules. They can be determined empirically.

In general, an organic polymer support used herein is resistant to ultraviolet irradiation and analysis conditions. The support can be made in any shape (e.g., a sheet, a tube, or a bead), and may include etches, ridges, or grids on its surface to create a patterned substrate. Additionally, it can be opaque, translucent, or transparent. The support can also include wells or grooves.

Supports of different colors may be obtained by including different additives such as dyes. A white support is suitable for use in a color detection-based assay and a black support is suitable for use in a fluorescence detection-based assay. A support can also be transparent, as transparency facilitates detection of color or fluorescence under a microscope, Before immobilization of biomolecules onto an unmodified surface of the support, it is preferred that the surface be cleaned, e.g., first with 70% alcohol and then with acetone.

A biomolecule used to practice this invention can be prepared using any convenient methodology. For example, where the biomolecule is a nucleic acid, it can be prepared chemically (e.g., using DNA/RNA synthesizer) or enzymatically (e.g., amplified from a polymerase chain reaction), or prepared from a biological source. A nucleic acid can be a synthetic oligonucleotide, a genomic DNA, a cDNA, an RNA, or a peptide nucleic acid (PNA). The synthetic oligonucleotide and PNA are generally at least 10 or 20 nucleotides in length. The DNA or the RNA may be as long as 200, 2000, or 5000 nucleotides or longer. Where the biomolecule is a polypeptide, it can be synthesized by a peptide synthesizer or by recombinant methods.

According to this invention, unmodified biomolecules can be immobilized onto an unmodified surface of an organic polymer support either randomly or in an order. Preferably, the biomolecules are arranged into an ordered array, i.e., a rectangular matrix. The array can contain a number of different biomolecules. Such an array can be used to detect an analyte in a sample. More specifically, a sample suspected of containing an analyte of interest is contacted with the array under conditions sufficient for the analyte to specifically bind to a biomolecule in the array. The binding can be detected through use of a signal production system such as an enzymatic, isotopic, or fluorescent label present on the analyte.

The array may have a plurality of addresses. For example, it can have a density of at least 10, 100, 1000, 10000, or more addresses per cm$^2$; the number of addresses is at least 5, 50, 100, 500, 1000, 5000, 10000, or more; the center-to-center distance between addresses is 5 cm, 10 mm, 1 mm, 1 μm, 1 nm, 0.1 nm or less, or any distance in between; and the longest diameter of each address is 1 cm, 1 mm, 1 μm, 1 nm, 0.1 nm or less, or any length in between. Each address can contain 1 mg, 1 μg, 1 ng, 100 pg, 10 pg, 0.1 pg, or less of a biomolecule, or any amount in between. Alternatively, each address can contain 100, $10^4$, $10^6$, $10^8$, or more biomolecules, or any amount in between. Different addresses (e.g., different demarcated regions) may have the same or different amounts of biomolecules. Each address can be directly adjacent to at least one another address. Alternatively, the addresses can be separated from each other, e.g., by a ridge or by an etch. The addresses can be distributed on the unmodified surface of an organic polymer support in one dimension, e.g., a linear array; or in two dimensions, e.g., a rectangular array.

An organic polymer support with a planar surface can be used to generate an array of a diverse set of biomolecules. In one exemplary application, oligonucleotides of different sequences are positioned on an unmodified surface to form an array. Such an oligonucleotide array can be used to analyze a complex sample containing multiple analytes, each of which may hybridize to one or more oligonucleotides within the array. This technique is useful for gene discovery, differential gene expression analysis, sequencing, or genomic polymorphism analysis. Another exemplary application is a polypeptide array, e.g., an array of antigens or antibodies.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are hereby incorporated by reference in their entirety.

EXAMPLE 1

A nucleic acid biochip was prepared and used in a hybridization reaction following the procedures described below:

Immobilization of Probes on an Acrylic Support

Probe sequences were selected from 5' ends of uncoded regions of enterovirus genes. 25-mers of thymines were attached to the 5' terminus of the sequences. Three probes were designed:

```
cEVprobe 1 (52-mer):  5'-(T)25TCCTCCGGCCCCTGAATGCGGCTAATC-3'                              (SEQ ID NO:1)

cEVprobe 2 (58-mer):  5'-(T)25TGTCGTAACG(G/C)GCAA(C/G)TC(T/C)G(C/T)(A/G)GCGGAACCGAC-3'   (SEQ ID NO:2)

cEVprobe 3 (53-mer):  5'-(T)25TACTTTGGGTGTCCGTGTTTC(T/C/A)TTTTAT-3'.                     (SEQ ID NO:3)
```

An acrylic support (i.e., acrylic resin) was used for immobilizing nucleic acids. The acrylic support was cut into a size of about 8 mm×15 mm. Each of the three probes described above was dissolved in a 0.05% sodium dodecyl sulfate (SDS) solution at a concentration of 2 μM. A 0.3 μL aliquot of each probe-containing solution was then spotted on the unmodified surface of the acrylic support. In addition, a M13 universal primer was used as a negative control. After air-drying, ultraviolet irradiation (254 nm) of the surface was performed from a distance of 1.5 cm for 3 minutes to produce a biochip, i.e., an acrylic substrate with the probes immobilized on its surface.

Preparation of Target DNA

Primers were selected from sequences of untranslated regions at the 5' terminus of enterovirus genes. Biotins were labeled at the 5' end of each primer. Forward and reverse primers were, respectively, as follows:

```
                                                                (SEQ ID NO:4)
f-cEV 2 (21-mer):
5'-biotin-CAAGCACTTCTGT(T/A/C)(T/A/C)CCCCGG-3'

(SEQ ID NO:5)
r-cEV 2 (20-mer):
5'-biotin-ATTGTCACCATAAGCAGCCA-3'
```

RNA (10 μL) of enterovirus was added to RT-PCR reverse transcription-polymerase chain reaction reagents (Ready-TO-GO, Amersham Pharmacia Biotech) in a tube. Primer r-cEV 2 (2 μM, 1 μL) was then added to the tube, heated to 70° C. for 10 minutes, and ice bathed for 2 to 3 minutes. Diethyl pyrocarbonate (DEPC)-treated-water was added to the tube to obtain a 50 μL solution. The solution was kept at 42° C. for 45 minutes, heated to 70° C. for 10 minutes, and then ice-bathed to room temperature. Before PCR, the other primer, f-cEV 2, was added to the solution. The PCR reaction conditions were: 94° C. for 3 minutes, 94° C. for 40 seconds, 54° C. for 40 seconds, and 72° C. for 40 seconds for 35 cycles, and finally 72° C. for 10 minutes.

Hybridization Reaction

The biochip obtained above was placed on a support in a container. A hybridization buffer (5×SSC, 0.1% N-lauroylsarcosine, 0.02% SDS, 1% blocking reagent (Boehringer Mannheim)) was pre-heated at 45° C. The PCR product (2.5 µL, about 10 ng/µL) was added to the hybridization buffer (5 mL) to obtain a DNA-containing solution. The DNA-containing solution was added to the container. The hybridization reaction was carried out at 45° C. for 20 minutes. After the hybridization, the biochip was washed with 2×SSC/0.1% SDS twice, for 1 minute each time. It was rinsed with a maleic acid buffer. (0.1 M maleic acid, 0.15 M NaCl, pH 7.5), reacted with streptaridin-alkaline phosphatase (a stock solution was diluted in 0.1 M maleic acid, 0.15 M NaCl, 1% blocking, pH 7.5 by 2000 times) for 20 minutes, and then washed with the maleic acid buffer twice, for 1 minute each time. For detection, the biochip was equilibrated with a detection buffer (100 mM Tris-HCl, 100 mM NaCl, 50 mM $MgCl_2$, pH 9.5) for 2 minutes. A detection solution was produced by adding 200 µL nitroblue tetrazolium/5-bromo-4-chloro-3-indolyl-phosphate (Boehringer Mannheim) to 10 mL of the detection buffer. After incubating with the detection solution for 10 minutes, the biochip was washed with water for 5 minutes. All three probes gave hybridization signals, and the negative control did not. Thus, the results indicate that the hybridization signals of the three probes are specific. Furthermore, three duplicated experiments showed that the same hybridization signal intensity was obtained for each probe.

EXAMPLE 2

Nucleic acid biochips were prepared employing different ultraviolet irradiation for various durations. The procedures were the same as those in Example 1, except that various ultraviolet irradiation durations were employed: 10 seconds, 20 seconds, 30 seconds, 1 minute, 3 minutes, and 5 minutes. All three probes gave hybridization signals when immobilized by ultraviolet irradiation for all durations except the 10-second duration. Further, the signal intensity increased as the irradiation duration increased.

EXAMPLE 3

Nucleic acid biochips were prepared by employing ultraviolet irradiation at different wavelengths. The procedures were the same as those in Example 1, except that two ultraviolet lights, i.e., 254 nm and 312 nm, were, respectively, applied for 6 minutes or 10 minutes. All three probes were effectively immobilized on the acrylic support when ultraviolet irradiation was performed at 254 nm for either 6 or 10 minutes. However, at 312 nm, cEVprobe 2 was immobilized on the support only when the irradiation was applied for 10 minutes, but not for 6 minutes. The other two probes were immobilized on the support when the irradiation at 312 nm was applied for either 6 or 10 minutes.

EXAMPLE 4

Nucleic acid biochips were prepared on various organic polymers. The procedures were the same as those in Example 1, except that various supports were used: a polystyrene 96 well plate, rubber, latex, polypropylene, polyethylene, and 3M Scotch tape (which consists of a matte-finish cellulose acetate carrier and an acrylic polymer adhesive). The results showed that all three probes were immobilized on all of the supports.

EXAMPLE 5

Two protein biochips were prepared following the procedures described below: Porcine blood serum was 10-time series diluted by phosphate-buffered saline. Five microliters of the diluted blood serum solution was spotted on two acrylic supports. After the solution on the support was air-dried, one support was irradiated with ultraviolet light (254 nm) from a distance of 1.5 cm for 3 minutes to produce a biochip, i.e., an acrylic substrate with the serum proteins immobilized on its surface. Another support was only air-dried, not irradiated with ultraviolet light, to produce another biochip.

Both biochips were incubated in a solution containing mice anti-swine antibody conjugated with alkaline phosphatase at a temperature of 37° C. for 30 minutes. The biochips were then washed with a maleic acid buffer twice, 1 minute each time. For detection, each biochip was equilibrated with a detection buffer (100 mM Tris-HCl, 100 mM NaCl, 50 mM $MgCl_2$, pH 9.5) for 2 minutes. A detection solution was produced by adding 200 µL nitroblue tetrazolium/5-bromo-4-chloro-3-indolyl-phosphate (Boehringer Mannheim) to 10 mL of the detection buffer. After incubating with the detection solution for 10 minutes, each biochip was washed with water for 5 minutes. The results indicated that the proteins were effectively immobilized on both acrylic supports. The biochip obtained by ultraviolet irradiation generates stronger hybridization signals than the one obtained without irradiating with ultraviolet.

OTHER EMBODIMENTS

All of the features disclosed in this specification may be combined in any combination. Each feature disclosed in this specification may be replace by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A nucleic acid-bound substrate comprising:
   a support made of an organic polymer and having an unmodified surface; and
   a plurality of unmodified nucleic acids immobilized on the unmodified surface;
   wherein the organic polymer is acrylic resin, polyethylene, polysulfone, cellulose acetate, polyethylene terephthalate, acrylonitrile butadiene styrene, acrylonitrile styrene, or a combination thereof.

2. The substrate of claim 1, wherein the organic polymer is acrylic resin, polyethylene, cellulose acetate, or a combination thereof.

3. The substrate of claim 2, wherein the unmodified surface is non-porous.

4. The substrate of claim 3, wherein the organic polymer is acrylic resin.

5. A nucleic acid-bound substrate comprising:
   a support made of an organic polymer and having an unmodified non-porous surface; and
   a plurality of unmodified nucleic acids immobilized on the unmodified non-porous surface;
   wherein the organic polymer is acrylic resin, polyethylene, polysulfone, cellulose acetate, polyethylene terephthalate, acrylonitrile butadiene styrene, acrylonitrile styrene, or a combination thereof.

6. A method of preparing a biomolecule-bound substrate, comprising:
   placing a plurality of unmodified biomolecules on an unmodified surface of a support made of an organic polymer; and
   irradiating the unmodified biomolecules and the unmodified surface with ultraviolet light;
   wherein the organic polymer is acrylic resin, polyethylene, polysulfone, cellulose acetate, polyethylene terephthalate, acrylonitrile butadiene styrene, acrylonitrile styrene, or a combination thereof.

7. The method of claim 6, wherein the organic polymer is acrylic resin, polyethylene, cellulose acetate, or a combination thereof.

8. The method of claim 7, wherein the unmodified surface is non-porous.

9. The method of claim 8, wherein the organic polymer is acrylic resin.

10. The method of claim 6, wherein the unmodified biomolecules are polypeptides.

11. The method of claim 10, wherein the organic polymer is acrylic resin, polyethylene, cellulose acetate, or a combination thereof.

12. The method of claim 11, wherein the unmodified surface is non-porous.

13. The method of claim 12, wherein the organic polymer is acrylic resin.

14. The method of claim 6, wherein the unmodified biomolecules are nucleic acids.

15. The method of claim 14, wherein the organic polymer is acrylic resin, polyethylene, cellulose acetate, or a combination thereof.

16. The method of claim 15, wherein the unmodified surface is non-porous.

17. The method of claim 16, wherein the organic polymer is acrylic resin.

18. A method of preparing a biomolecule-bound substrate, comprising:
    placing a plurality of unmodified biomolecules on an unmodified non-porous surface of a support made of organic polymer; and
    irradiating the unmodified biomolecules and the unmodified non-porous surface with ultraviolet light;
    wherein the organic polymer is acrylic resin, polyethylene, polysulfone, cellulose acetate, polyethylene terephthalate, acrylonitrile butadiene styrene, acrylonitrile styrene, or a combination thereof.

19. The method of claim 18, wherein the unmodified biomolecules are polypeptides.

20. The substrate of claim 18, wherein the unmodified biomolecules are nucleic acids.

\* \* \* \* \*

UNITED STATES PATENT AND TRADEMARK OFFICE
CERTIFICATE OF CORRECTION

| | | |
|---|---|---|
| PATENT NO. | : 7,109,024 B2 | |
| APPLICATION NO. | : 10/408519 | |
| DATED | : September 19, 2006 | |
| INVENTOR(S) | : Kan-Hung Lee et al. | |

It is certified that error appears in the above-identified patent and that said Letters Patent is hereby corrected as shown below:

Col. 1., under Related U.S. Application Data, item (63), line 2 after "abandoned" please insert --, which claims priority from Taiwanese Application 88119858, filed November 15, 1999 --

Signed and Sealed this

Eighteenth Day of September, 2007

JON W. DUDAS
*Director of the United States Patent and Trademark Office*